(12) United States Patent
Kobayashi

(10) Patent No.: US 10,902,378 B2
(45) Date of Patent: Jan. 26, 2021

(54) INVENTORY MANAGEMENT SERVER

(71) Applicant: TOSHIBA TEC KABUSHIKI KAISHA, Tokyo (JP)

(72) Inventor: Tohru Kobayashi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 15/890,888

(22) Filed: Feb. 7, 2018

(65) Prior Publication Data

US 2018/0268354 A1  Sep. 20, 2018

(30) Foreign Application Priority Data

Mar. 15, 2017  (JP) ................. 2017-050118

(51) Int. Cl.
*G06Q 10/08* (2012.01)
*G06F 16/23* (2019.01)
(52) U.S. Cl.
CPC ........... *G06Q 10/087* (2013.01); *G06F 16/23* (2019.01)
(58) Field of Classification Search
CPC ............. G06Q 10/087; G06Q 30/0633; G06Q 20/3224; H04L 67/18; G06F 16/23
See application file for complete search history.

(56) References Cited

U.S. PATENT DOCUMENTS

| 9,743,232 B2 | 8/2017 | Umetani et al. | |
| 2014/0006131 A1* | 1/2014 | Causey | G06Q 10/0875 705/14.24 |

(Continued)

FOREIGN PATENT DOCUMENTS

| JP | 2009-205293 A | 9/2009 |
| JP | 2009-258947 A | 11/2009 |
| JP | 2013-196556 A | 9/2013 |

OTHER PUBLICATIONS

Extended European Search Report dated May 28, 2018, filed in counterpart European Patent Application No. 18156919.5 (9 pages).

(Continued)

*Primary Examiner* — Florian M Zeender
*Assistant Examiner* — Vanessa Deligi
(74) *Attorney, Agent, or Firm* — Kim & Stewart LLP

(57) ABSTRACT

A server for providing inventory management includes a storage device that stores: an inventory database data including an identification code of each of a plurality of commodities owned by a user, and location data corresponding to a predetermined area. A processor receives, from a portable terminal, an identification code acquired by the portable terminal and position information indicating a position of the portable terminal. The processor determines whether the position information corresponds to a position within the predetermined area. If the position information corresponds to a position within the predetermined area, the storage device updates the inventory database based on the received identification code. If the position information does not correspond to a position within the predetermined area, the processor determines, based on comparing the received identification code to the inventory database, whether purchase of a commodity corresponding to the received identification code should be reviewed.

14 Claims, 2 Drawing Sheets

(56) References Cited

U.S. PATENT DOCUMENTS

| | | | | |
|---|---|---|---|---|
| 2014/0066101 A1* | 3/2014 | Lyman | ................... | H04W 4/50 |
| | | | | 455/456.3 |
| 2014/0123253 A1* | 5/2014 | Davis | ................... | G06F 21/316 |
| | | | | 726/6 |
| 2014/0192182 A1* | 7/2014 | Wait | ..................... | G06Q 30/00 |
| | | | | 348/121 |
| 2015/0161647 A1* | 6/2015 | Arai | .................. | G06Q 30/0233 |
| | | | | 705/14.33 |
| 2016/0189150 A1* | 6/2016 | Ahuja | ............... | G06Q 20/4016 |
| | | | | 705/44 |
| 2017/0169189 A1* | 6/2017 | Belz | ....................... | H04L 67/12 |

OTHER PUBLICATIONS

Andreas Komninos, et al., "me-Commerce: An Infrastructure for Personal Predictive Mobile Commerce", Proceedings of the International Conference on Mobile Business, IEEE Computer Society, Jun. 1, 2006.

George Roussos, et al., "Systems Architecture for Pervasive Retail", Proceedings of the 2003 ACM Symposium on Applied Computing, Melbourne, Florida, USA, Mar. 9-12, 2003, Association for Computing Machinery, New York, New York, pp. 631-636.

* cited by examiner

INVENTORY MANAGEMENT SERVER

CROSS-REFERENCE TO RELATED APPLICATION

This application is based upon and claims the benefit of priority from Japanese Patent Application No. 2017-050118, filed Mar. 15, 2017, the entire contents of which are incorporated herein by reference.

FIELD

Embodiments described herein relate generally to an inventory management server.

BACKGROUND

A consumer creates a list of articles that the consumer has previously purchased or the like. Then, when the consumer wants to purchase a new article, it can be determined whether or not the article was previously purchased, based on the list.

However, the burden is very large for the consumer to manually create and manage a useful list which allows for effective determination.

DETAILED DESCRIPTION

An inventory management server for providing inventory management includes a storage device that stores, in association with each of a plurality of member codes: an inventory database data including an identification code of each of a plurality of commodities owned by a user, and location data corresponding to a predetermined area. A processor receives, from a portable terminal, an identification code acquired by the portable terminal and position information indicating a position of the portable terminal when the identification code is acquired. The processor determines whether the position information corresponds to a position within the predetermined area. If the position information corresponds to a position within the predetermined area, the storage device updates the inventory database based on the received identification code. If the position information does not correspond to a position within the predetermined area, the processor determines, based on comparing the received identification code to the inventory database, whether purchase of a commodity corresponding to the received identification code should be reviewed. Screen data for displaying a screen indicating the determination is transmitted to the portable terminal.

Hereinafter, an example of an embodiment will be described with reference to the drawings. In this embodiment, a webserver having a function as a list management device will be described as an example.

Figure 1:
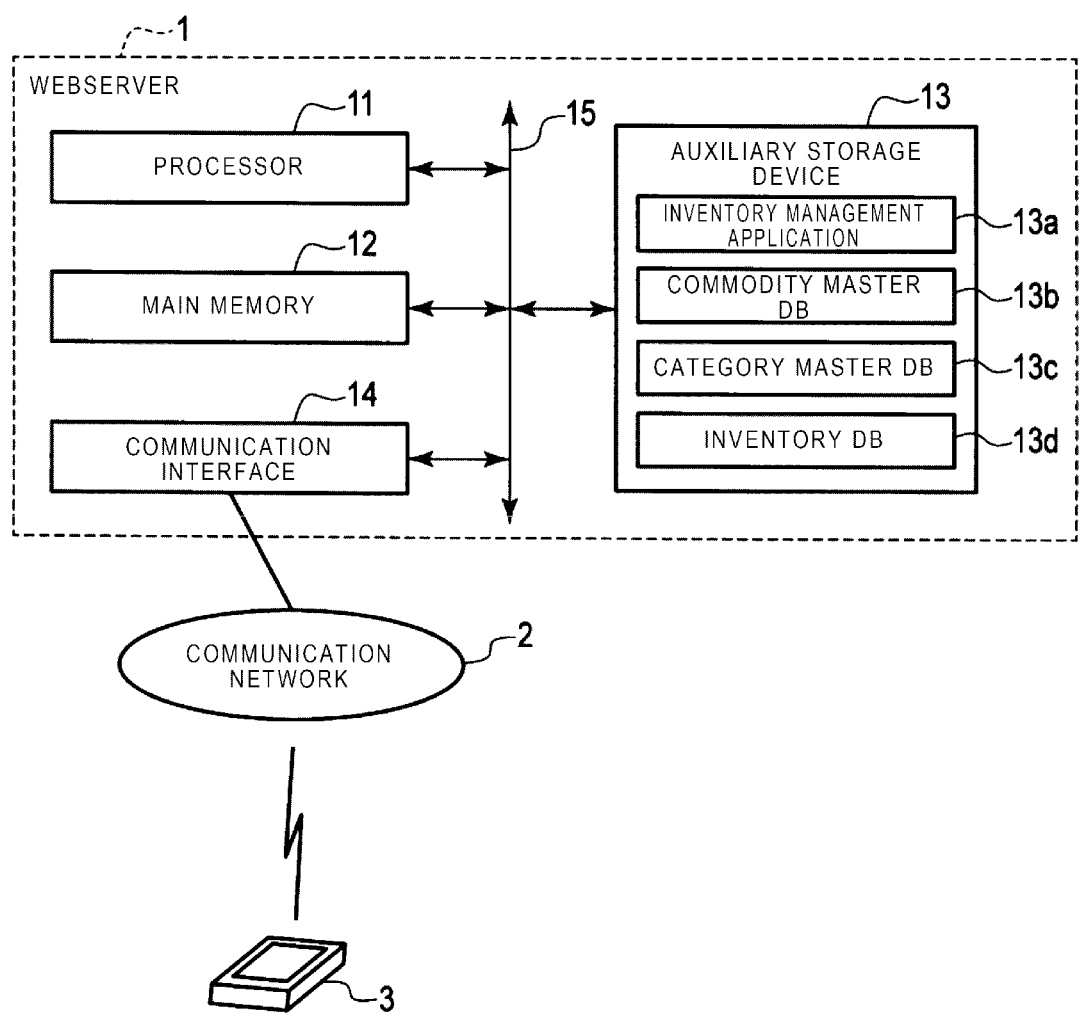
FIG. 1 is a block diagram illustrating an example configuration of a webserver according to an embodiment.

FIG. 1 is a block diagram illustrating an example configuration of a webserver according to the embodiment.

The webserver 1 provides a web service for a user using a portable terminal 3 via a communication network 2. The web service is used for performing inventory management of articles stored in a house of the user. It is assumed that the user who uses the web service is previously registered as a member. A user who uses the web service by using the portable terminal 3 is referred to as a "member" below. The communication network 2 is, for example, a combination of a mobile data communication network and the Internet. The portable terminal 3 may be, for example, a smart phone, a tablet terminal, and the like.

The webserver 1 includes a processor 11, a main memory 12, an auxiliary storage device 13, a communication interface 14, and a transmission system 15. As hardware of the webserver 1, for example, a computer device for a general-purpose server may be used.

In the webserver 1, the processor 11, the main memory 12, and the auxiliary storage device 13 are connected to each other by the transmission system 15, so as to function as a computer that controls the webserver 1.

The processor 11 corresponds to the main controller of the computer. The processor 11 controls the components to realize various functions as the webserver 1, in accordance with an operating system or an application program.

The main memory 12 corresponds to the main storage device of the computer. The main memory 12 includes a nonvolatile memory area and a volatile memory area. The main memory 12 stores the operating system or the application program in the nonvolatile memory area. The main memory 12 stores data required when the processor 11 performs various types of information processing in the nonvolatile or volatile memory area. In the main memory 12, the volatile memory area is used as a work area in which data is appropriately rewritten by the processor 11.

The auxiliary storage device 13 corresponds to the auxiliary storage device of the computer. The auxiliary storage device 13 may be, for example, an electric erasable programmable read-only memory (EEPROM), a hard disk drive (HDD), a solid state drive (SSD), and the like. The auxiliary storage device 13 preserves data used when the processor 11 performs various types of information processing, or data generated by processing in the processor 11. The auxiliary storage device 13 may store the application program.

One of application programs stored in the auxiliary storage device 13 is an inventory management application 13a which is a program (which will be described later) for providing the web service. A portion of a storage area in the auxiliary storage device 13 is used for a commodity master database (commodity master DB) 13b, a category master database (category master DB) 13c, and an inventory database (inventory DB) 13d.

The commodity master DB 13b includes various types of information regarding each commodity which may be distributed. As information included in the commodity master DB 13b, for example, a commodity code, a commodity category code, and the like are provided. The commodity code is a unique code for each commodity item. The commodity category code is a code which is unique to a commodity category to which a commodity belongs.

The category master DB 13c is a set of various types of information regarding a commodity category. As information included in the category master DB 13c, for example, the category code, a commodity category name, and the like are provided. The commodity category name is the name determined to cause a person to easily recognize a commodity category.

The inventory DB 13d is a set of data for managing article stored in a house of a member, for each member.

The auxiliary storage device 13 stores a member code of each member and a member database for managing information of a position and the like of a house of a member, for example.

When a computer device for a general-purpose server is used as the webserver 1, the computer device and the inventory management application 13a may be separately provided to the user of the webserver 1. Thus, the inventory management application 13a is written onto the auxiliary storage device 13 included in the computer device, under an operation of a user or a serviceman. At this time, the inventory management application 13a may be transferred by being recorded in a removable recording medium such as a magnetic disk, a magneto-optical disk, an optical disk, and a semiconductor memory, or by communication via a network. The webserver 1 may be provided to the user in a state where the inventory management application 13a is already written in the auxiliary storage device 13.

The communication interface 14 provides for data communication via the communication network 2.

The transmission system 15 includes a bus line and an interface circuit. The bus line includes an address bus, a data bus, and the like. The interface circuit connects the components to the bus line. The transmission system 15 transmits data or a signal which is transmitted and received between the components which are connected to each other.

Next, an operation of the webserver 1 as described above will be described.

When a member performs member registration for using a web service provided by the webserver 1, for example, the webserver 1 issues a unique member code that is different from the member codes of all other members. During the member registration, the member provides an address of a house. The webserver 1 updates the member database so as to indicate position information and the like corresponding to the address, in association with the member code.

The member causes the portable terminal 3 to execute an application program for using the web service. The member inputs the member code which is issued as described above, in the application program. When the member registers a possessed article, or when the member confirms whether or not it is proper that a target article to be possessed will be possessed, the member inputs an identification code relating to the target article into to the portable terminal 3. Typically, the web service provided by the webserver 1 is used for causing a member to register a commodity purchased by the member and to confirm whether or not purchase of a new commodity is proper in consideration of previous purchase history. Thus, such a use form will be specifically described below. That is, possession of an article corresponds to purchase of a commodity. It is assumed that, for example, a commodity code such as a Japanese article number (JAN) code is provided as the identification code of an article. An article may be possessed by the member in another manner, such as acceptance without payment. Thus, an article is not limited to a commodity that is sold.

A commodity code is input to the portable terminal 3, for example, via a wireless signal transmitted by a radiofrequency identification (RFID) tag that is attached to an article and read by a tag reader. Alternatively, for example, the commodity code is input based on a camera included in the portable terminal 3 reading a bar code displayed on a commodity as an object for indicating a commodity code. The commodity code may be input by other various methods, for example, a manual input by an operation of a touch panel included in the portable terminal 3. It is assumed that the member performs an input for the registration in the house of the member, and performs an input for the confirmation outside of the house of the member.

If the identification code is input as described above, the portable terminal 3 transmits request data including the commodity code to the webserver 1. The portable terminal 3 causes the request data to include input date-and-time data, input position data, and a member code assigned to the member, in addition to the commodity code. The input date-and-time data indicates a time when the commodity code is input. The input position data indicates a position of the portable terminal 3 when the commodity code is input. The request data may include any type of data.

If the request data is transmitted to the webserver 1 via the communication network 2, the communication interface 14 receives the request data. In response, the processor 11 starts information processing illustrated in FIG. 2, based on the inventory management application 13a. Details of the information processing which will be described below are just an example, and various types of information processing in which it is possible to obtain the similar function can be appropriately used.

The processor 11 stores the request data received by the communication interface 14 as described above, in the main memory 12 or the auxiliary storage device 13 (Act 1). As described above, the request data includes the commodity code acquired in the portable terminal 3, and position information indicating the position of the portable terminal 3 when the commodity code is read by the portable terminal 3. Since the processor 11 performs the information processing based on the inventory management application 13a, the computer which uses the processor 11 as the core functions as acquisition means.

The processor 11 confirms whether or not a position indicated by the position information included in the request data is a position corresponding to the house of the member (Act 2). For example, if the position is in a predetermined region included in a position indicated by the position information which is stored in the member database in association with the member code included in the request data, the processor 11 determines Yes in Act 2 and proceeds to Act 3. As an example, the predetermined region is set to be a circular area which has a predetermined radius having the position indicated by the position information stored in the member database set as the center. The predetermined region may be determined by any method. Considering accuracy of position detection in the portable terminal 3, it is preferable that the predetermined region is determined as a region in which the input position can be assumed to be in the house of the member.

The processor 11 transmits selection screen data for displaying a selection screen to the portable terminal 3 (Act 3). The selection screen is a screen for causing the member to select whether to perform registration or deletion of the commodity code. In the portable terminal 3, a display device included in the portable terminal 3 displays the selection screen based on the above-described application program. The member performs an operation for designating registration or deletion, on the portable terminal 3 in accordance with the selection screen. The webserver 1 is notified of details of this operation by the portable terminal 3.

The processor 11 confirms whether or not registration is designated by the operation (Act 4). If a notification indicating that registration is designated is received from the portable terminal 3, the processor 11 determines Yes in Act 4 and proceeds to Act 5.

The processor 11 updates the inventory DB 13d so as to store the member code, the commodity code, and the input date-and-time data which are included in the request data, in association with each other (Act 5). Since the processor 11 performs the information processing illustrated in FIG. 2 whenever request data is sent from the portable terminal 3, the commodity code is added to the inventory DB 13*d* every time the information processing is performed. The inventory DB 13*d* stores the list of commodities possessed by the member. The processor 11 performs the information processing based on the inventory management application 13*a*, including adding the commodity code to the list of commodities. Then, the processor 11 proceeds to Act 7.

Meanwhile, if deletion is designated on the selection screen and a notification indicating that deletion is designated is received from the portable terminal 3, the processor 11 determines No in Act 4 and proceeds to Act 6. The processor 11 determines either addition or deletion, in accordance with an instruction by the member as the user. The processor 11 performs the information processing based on the inventory management application 13*a*, including performing the decision of either addition or deletion.

The processor 11 updates the inventory DB 13*d* such that the commodity code included in the request data is deleted from commodity codes stored in association with the member code included in the request data (Act 6). That is, The processor 11 deletes the commodity code as the acquired identification code, from the list shown in the inventory DB 13*d*. The processor 11 performs the information processing based on the inventory management application 13*a*, including performing deletion. Then, the processor 11 proceeds to Act 7.

The processor 11 performs learning processing for a consumption trend regarding a commodity which is the update target in the inventory DB 13*d* (Act 7). That is, for example, if the processor 11 updates the inventory DB 13*d* by performing addition of a commodity code, the processor 11 obtains, for example, data of a purchase period and the like indicating a tendency regarding purchase of a commodity identified by the added commodity code or purchase of a commodity having a commodity category to which the above commodity belongs. For example, if the processor 11 updates the inventory DB 13*d* by performing deletion, the processor 11 obtains, for example, data of time required for consumption, which indicates a tendency regarding consumption of a commodity identified by the deleted commodity code or consumption of a commodity having a commodity category to which the above commodity belongs. The manner of the learning processing may be determined by, for example, a creator of the inventory management application 13*a*, a manager of the webserver 1, or the like. The processor 11 uses the commodity master DB 13*b* and the inventory DB 13*d* as the reference for the learning processing. If the processor 11 performs the learning processing in consideration of a commodity category, the processor 11 also uses the category master DB 13*c* as the reference. The processor 11 stores data obtained by the learning processing herein, in the auxiliary storage device 13. The processor 11 performs the information processing based on the inventory management application 13*a*, including the learning processing. If the processor 11 ends the learning processing, the processor 11 completes processing regarding the request data which is sent from the portable terminal 3.

If the input position is not in the predetermined region, the processor 11 determines No in Act 2 and proceeds to Act 8.

The processor 11 determines whether or not a commodity identified by the commodity code included in the request data (referred to as a confirmation target commodity below) or a commodity of a commodity category to which the confirmation target commodity belongs (referred to as a same-kind commodity) was previously purchased (Act 8). In addition, the processor 11 may confirm whether or not the commodity was purchased in the previous predetermined period. A manner for determining that the commodity is previously purchased may be determined, for example, by a creator of the inventory management application 13*a*, a manager of the webserver 1, or the like. The processor 11 uses the commodity master DB 13*b* and the inventory DB 13*d* as the reference for the confirmation. If the processor 11 performs the confirmation by considering a commodity category, the processor 11 also uses the category master DB 13*c* as the reference. If the commodity was previously purchased, the processor 11 determines Yes in Act 8 and proceeds to Act 9.

The processor 11 determines the remaining amount of confirmation target commodities or the remaining amount of same-kind commodities in the house of the member (Act 9). For example, this determination can be performed by using the inventory DB 13*d* and data of a time and the like required for consumption, which is obtained in the learning processing. Here, it is not necessary that the actual remaining amount of confirmation target commodities or the remaining amount of same-kind commodities in the house of the member is accurately determined, and errors may be included.

The processor 11 determines whether or not reviewing of purchase of the confirmation target commodity is needed (Act 10). For example, if the remaining amount determined as described above is equal to or greater than a threshold predetermined for the confirmation target commodity, the processor 11 determines that review is needed. Here, a manner of the determination may be determined, for example, by a creator of the inventory management application 13*a*, a manager of the webserver 1, or the like. The processor 11 determines that purchase of the commodity as an article is to be reviewed, based on the list shown in the inventory DB 13*d*. The processor 11 performs the information processing based on the inventory management application 13*a*, including performing the determination of whether the purchase is to be reviewed. In the embodiment, the processor 11 performs the determination when it is determined that an acquisition position is not the house of the member. The position which is determined to be not the house of the member is set as a confirmation position. However, a position which is predetermined may be set as the confirmation position. If the processor 11 determines Yes in Act 10 because review is needed, the processor 11 proceeds to Act 11.

The processor 11 transmits warning screen data for displaying a warning screen to the portable terminal 3 (Act 11). The warning screen is a screen for reporting a message indicating to the member that purchase of the confirmation target commodity is to be reviewed because there is a probability that inventory in the house of the member is sufficient. In the portable terminal 3, the display device included in the portable terminal 3 displays the warning screen based on the above-described application program. Thus, as described above, the member recognizes that purchase of a commodity of which the commodity code is input is to be reviewed. In this manner, transmission of the warning screen data is an example of notification processing for notifying the member as the user to determine that purchase of the commodity is to be reviewed. The processor 11 performs the information processing based on the inventory management application 13*a* including transmission of the warning screen data. If the processor 11 ends transmission of the warning screen data, the processor 11 completes processing with respect to the request data which is sent from the portable terminal 3.

When the processor 11 determines No in Act 8 because the commodity is not previously purchased, or when the processor 11 determines No in Act 10 because review of the purchase is not needed, the processor 11 proceeds to Act 12.

The processor 11 transmits notification screen data indicating a notification screen to the portable terminal 3 (Act 12). The notification screen is a screen for reporting a message indicating that purchase of the confirmation target commodity is proper, to the member. In the portable terminal 3, the display device included in the portable terminal 3 displays the notification screen based on the above-described application program. Thus, as described above, the member recognizes that purchase of a commodity for which the commodity code is input is proper. If the processor 11 ends transmission of the notification screen data, the processor 11 completes processing regarding the request data which is sent from the portable terminal 3.

As described above, according to the webserver 1, the list of commodities purchased by the member is managed in the inventory DB 13d. In order to add or delete a commodity to or from the list, the member may input a commodity code of the commodity to the portable terminal 3 in which the application program for using the web service is executed, in the house of the member. Thus, it is possible to reduce labor of the member when the member registers a new commodity purchased by the member, in the list.

According to the webserver 1, when the input position of the commodity code is in the house of the member, designation of the member regarding which one of addition and deletion is received and the list is updated by performing addition or is updated by performing deletion. Thus, the member must designate either addition or deletion, but the member may also delete a commodity code from the list. Thus, a commodity code of a consumed commodity is deleted from the list, and thus it is possible to maintain the list to accurately indicate an inventory status in the house of the member.

According to the webserver 1, if the input position of the commodity code is different from the house of the member, determination of whether or not purchase of a commodity identified by the commodity code is to be reviewed is performed with reference to the list, and the determination result is presented for the member. Thus, the member may input a commodity code to the portable terminal 3. The input commodity code is a commodity code of a commodity for which performing confirmation of whether or not purchase of the commodity is proper in consideration of the previous purchase circumstances is desired, in a place which is not the house of the member such as a store. Thus, the member can perform such confirmation by a simple operation.

In the webserver 1, when the list is updated by performing addition or is updated by performing deletion, a tendency regarding consumption of a commodity identified by the added or deleted commodity code or a commodity of a commodity category to which the above commodity belongs is learned. In the webserver 1, data obtained by the learning is used for determination of whether or not purchase of a commodity is to be reviewed. Thus, it is possible to more properly determine whether or not purchase of a commodity is to be reviewed, based on the learned tendency regarding consumption of a commodity.

Various modification forms as follows can be obtained from the embodiment.

Figure 2:
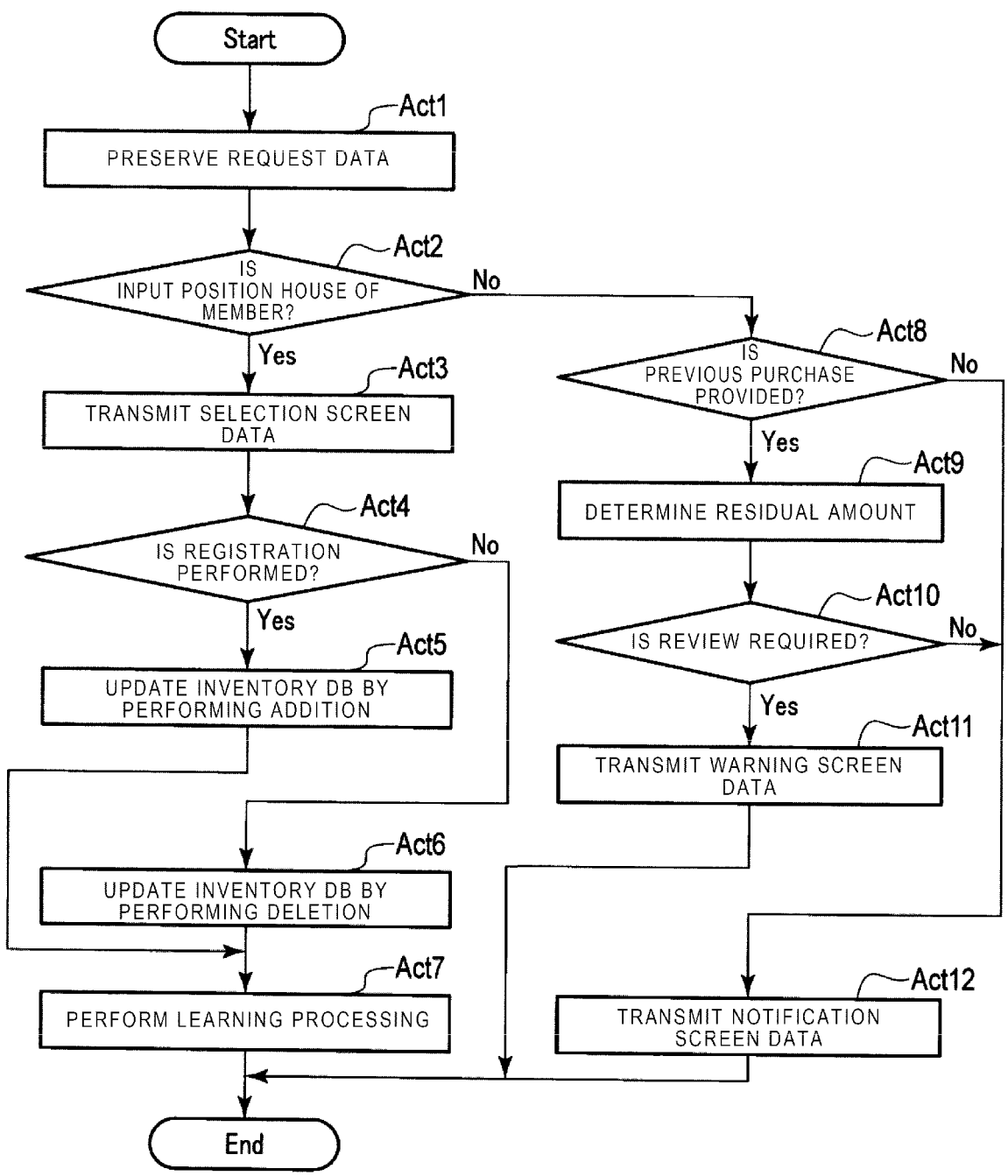
FIG. 2 is a flowchart illustrating a list management processing performed by the webserver.

All types of information processing illustrated in FIG. 2 may be performed by the processor provided in the portable terminal 3. That is, the function as the information management device may be provided in the portable terminal 3. In this case, in Act 1, the processor acquires a commodity code and a position information from an input device and a position detection device, and preserves the acquired commodity code and position information in a storage device included in the portable terminal 3. In Act 3, Act 11, and Act 12, the processor causes the display device included in the portable terminal 3 to display the various screens without transmission of data of the various screens. In this case, the processor may store at least one of the commodity master DB 13b, the category master DB 13c, and the inventory DB 13d in the storage device included in the portable terminal 3.

In the embodiment, an example in which a member purchases a commodity is described. However, it is possible to manage an article accepted for free by a member, without distinction.

The consumption date or the freshness date of a commodity identified by the commodity code may be acquired along with the commodity code, and may be preserved in the inventory DB 13d. The processor 11 may determine No in Act 10 when the consumption date or the freshness date of the commodity is expired, even if the confirmation target commodity or the same-kind commodity is in stock in the house of a member.

Some or all of the functions realized by the processor 11 through the information processing may be realized by hardware such as a logic circuit, which performs the information processing without the bases of the program. Each of the functions may be realized by combining software control with the hardware such as a logic circuit.

The registration position is not limited to the house of a member, and any position may be set. A plurality of registration positions may be set for one member.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inventory management server for providing inventory management, comprising:
   a storage device that stores, in association with each of a plurality of member codes:
      an inventory database data including an identification code of each of a plurality of commodities purchased by a user, and
      location data corresponding to a predetermined area;
   a communication interface; and
   a processor configured to:
      upon receipt of an identification code of a commodity and position information indicating a position of a portable terminal from the portable terminal, determine whether the user has previously purchased the commodity or is purchasing the commodity, based on whether the received position information corresponds to a position within the predetermined area, if the received position information corresponds to a position within the predetermined area, determine that the user has previously purchased the commodity, and control the communication interface to transmit to the portable terminal first screen data that causes the portable terminal to display an inventory update screen by which the user can specify that the purchased commodity be added to the inventory database data, and update the inventory database data to add the identification code of the purchased commodity upon receiving an input made on the inventory update screen by the user specifying that the purchased commodity be added to the inventory database data, and if the received position information does not correspond to a position within the predetermined area:

determine that the user is purchasing the commodity, search for the identification code of the commodity in the inventory database data, and determine whether purchase of the commodity should be reviewed, upon determining that the purchase should be reviewed, control the communication interface to transmit, to the portable terminal second screen data that causes the portable terminal to display a purchase review screen by which the user can approve the purchase, and upon determining that the purchase should not be reviewed, control the communication interface to transmit, to the portable terminal, third screen data that causes the portable terminal to display a purchase notification screen by which the user can confirm the purchase.

2. The server according to claim 1, wherein the processor is further configured to:

upon determining that the user has previously purchased the commodity, perform a learning processing to determine a consumption trend with respect to the commodity, and store the result of the learning processing in the storage device.

3. The server according to claim 2, wherein the processor determines whether purchase of the commodity should be reviewed based on the stored result of the learning processing that was previously performed with respect to the commodity.

4. The server according to claim 1, wherein:

the storage device further stores a commodity category database that identifies one or more categories of commodities, and the processor determines whether purchase of the commodity should be reviewed based on comparing the identification code of the commodity to the commodity category database.

5. An inventory management method comprising:

providing an inventory management server including instructions; and executing the instructions for:

storing, in association with each of a plurality of member codes:

an inventory database data including an identification code of each of a plurality of commodities purchased by a user, and location data corresponding to a predetermined area;

upon receipt of an identification code of a commodity and position information indicating a position of a portable terminal from the portable terminal, determining whether the user has previously purchased the commodity or is purchasing the commodity, based on whether the received position information corresponds to a position within the predetermined area;

if the received position information corresponds to a position within the predetermined area, determining that the user has previously purchased the commodity, and transmitting to the portable terminal first screen data that causes the portable terminal to display an inventory update screen by which the user can specify that the purchased commodity be added to the inventory database data, and updating the inventory database data to add the identification code of the purchased commodity upon receiving an input made on the inventory update screen by the user specifying that the purchased commodity be added to the inventory database data; and if the received position information does not correspond to a position within the predetermined area:

determining that the user is purchasing the commodity, search for the identification code of the commodity in the inventory database data, and determining whether purchase of the commodity should be reviewed, upon determining that the purchase should be reviewed, transmitting, to the portable terminal, second screen data that causes the portable terminal to display a purchase review screen by which the user can approve the purchase, and upon determining that the purchase should not be reviewed, transmitting, to the portable terminal, third screen data that causes the portable terminal to display a purchase notification screen by which the user can confirm the purchase.

6. The method according to claim 5, further comprising:

upon determining that the user has previously purchased the commodity, performing a learning processing to determine a consumption trend with respect to the commodity; and storing the result of the learning processing.

7. The method according to claim 6, wherein determining whether purchase of the commodity should be reviewed is based on the stored result of the learning processing that was previously performed with respect to the commodity.

8. The method according to claim 5, further comprising:

storing a commodity category database that identifies one or more categories of commodities, wherein determining whether purchase of the commodity should be reviewed is based on comparing the identification code of the commodity to the commodity category database.

9. The method according to claim 5, further comprising:

generating, with a camera on the portable terminal, an image of the commodity, wherein the identification code is acquired from the generated image.

10. A non-transitory computer readable medium causing an inventory management server to perform an inventory management method, the method comprising:

storing, in association with each of a plurality of member codes:
  an inventory database data including an identification code of each of a plurality of commodities purchased by a user, and
  location data corresponding to a predetermined area;
upon receipt of an identification code of a commodity and position information indicating a position of a portable terminal from the portable terminal, determining whether the user has previously purchased the commodity or is purchasing the commodity, based on whether the received position information corresponds to a position within the predetermined area;
if the received position information corresponds to a position within the predetermined area,
  determining that the user has previously purchased the commodity, and transmitting to the portable terminal first screen data that causes the portable terminal to display an inventory update screen by which the user can specify that the purchased commodity be added to the inventory database data, and
  updating the inventory database data to add the identification code of the purchased commodity upon receiving an input made on the inventory update screen by the user specifying that the purchased commodity be added to the inventory database data, and
if the received position information does not correspond to a position within the predetermined area:
  determining that the user is purchasing the commodity, search for the identification code of the commodity in the inventory database data, and determining whether purchase of the commodity should be reviewed,
  upon determining that the purchase should be reviewed, transmitting, to the portable terminal, second screen data that causes the portable terminal to display a purchase review screen by which the user can approve the purchase, and
  upon determining that the purchase should not be reviewed, transmitting, to the portable terminal, third screen data that causes the portable terminal to display a purchase notification screen by which the user can confirm the purchase.

11. The non-transitory computer readable medium according to claim 10, the method further comprising:
  upon determining that the user has previously purchased the commodity, performing a learning processing to determine a consumption trend with respect to the commodity; and
  storing the result of the learning processing.

12. The non-transitory computer readable medium according to claim 11, wherein determining whether purchase of the commodity should be reviewed is based on the stored result of the learning processing that was previously performed with respect to the commodity.

13. The non-transitory computer readable medium according to claim 10, the method further comprising:
  storing a commodity category database that identifies one or more categories of commodities, wherein determining whether purchase of the commodity should be reviewed is based on comparing the identification code of the commodity to the commodity category database.

14. The non-transitory computer readable medium according to claim 10, wherein the stored location data corresponding to the predetermined area is set in advance by a user corresponding to the member code.

* * * * *